United States Patent
Cregeur

(10) Patent No.: US 6,268,790 B1
(45) Date of Patent: Jul. 31, 2001

(54) ANTI-THEFT METHOD AND APPARATUS

(75) Inventor: Charles Cyril Cregeur, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/535,296

(22) Filed: Mar. 24, 2000

(51) Int. Cl.⁷ .................................................. B60Q 1/00
(52) U.S. Cl. ................... 340/425.5; 340/426; 307/10.2; 307/10.5
(58) Field of Search .................. 340/425.5, 426, 340/438, 465, 542, 543, 576, 825.31, 825.32; 307/10.2, 10.3, 10.4, 10.5; 180/443, 446, 272, 287; 361/171, 172

(56) References Cited

U.S. PATENT DOCUMENTS

| | | | |
|---|---|---|---|
| 3,802,531 | 4/1974 | Schiesterl | 180/271 |
| 4,534,436 | 8/1985 | Dufrene | 180/424 |
| 4,749,873 * | 6/1988 | Mutoh et al. | 307/10.2 |
| 5,398,017 | 3/1995 | Chen | 340/426 |
| 5,454,238 | 10/1995 | Ross et al. | 70/186 |
| 5,656,867 * | 8/1997 | Kokubu | 340/425.5 |
| 5,751,073 | 5/1998 | Ross | 307/10.5 |
| 5,811,887 | 9/1998 | Peyre et al. | 307/10.3 |
| 5,893,428 | 4/1999 | Fasse et al. | 180/403 |
| 5,893,429 | 4/1999 | Hackl et al. | 180/443 |
| 6,039,144 * | 3/2000 | Chandy et al. | 180/446 |
| 6,041,887 * | 3/2000 | Kojo et al. | 180/446 |

* cited by examiner

Primary Examiner—Van T. Trieu
(74) Attorney, Agent, or Firm—Tarolli, Sundheim, Covell, Tummino & Szabo L.L.P.

(57) ABSTRACT

An anti-theft apparatus (10) for use on a vehicle includes a torque sensor (16) for sensing applied steering torque and providing a signal (24) indicative thereof. A power assist motor (22) steerably connected to steerable wheels (20) of the vehicle. A detector (62) detects whether the vehicle has an authorized user. A controller (26) controls the power assist motor (22) in response to the steering torque signal (24). The controller (26) controls the power assist motor (22) in a first mode responsive to the sensed applied steering torque signal (24) when the detector (62) detects that the vehicle has an authorized user and in a second mode responsive to the sensed applied steering torque signal (24) when the detector (62) detects that the vehicle does not have an authorized user. The detector (62) detects an authorized user by sensing vehicle ignition using an authorized key or authorized entry to the vehicle's interior.

9 Claims, 2 Drawing Sheets

ANTI-THEFT METHOD AND APPARATUS

TECHNICAL FIELD

The present invention relates to a vehicle anti-theft system and more particularly to an anti-theft method and apparatus that employs an assist motor of the vehicle's steering assist system.

BACKGROUND OF THE INVENTION

Anti-theft systems for use on automobiles are generally well known. Some such systems include door locks, alarm systems, and keyless entry systems. Other mechanisms to help deter vehicle theft include systems which lock the steering wheel. Typically, a mechanical interlock is used to prevent the steering wheel from being turned without the initial proper turning of an ignition key. Additionally, after-market systems have been developed that lock the steering wheel in a fixed position and others that limit the amount that a steering wheel can be turned.

U.S. Pat. No. 5,893,429 to Hackl et al. discloses a steering system for a motor vehicle where improved theft protection is achieved by a steering lock that always engages as the vehicle is shut down. Thus, the driver of the vehicle is free from the task of engaging the steering lock.

U.S. Pat. No. 5,893,428 to Fasse et al. discloses a hydraulic power steering system for a motor vehicle that comprises valve arrangements to hydraulically lock the power steering. As a result, the vehicle steerable wheels can be hydraulically locked in a given position.

U.S. Pat. No. 4,534,436 to DuFrene discloses a apparatus for locking a hydraulic cylinder of a steering system into a disabled condition so as to discourage theft.

U.S. Pat. No. 5,751,073 to Ross discloses an electric steering column lock. The electric column lock is an electrically activated device which, when locked, prevents steering and thus prevents the vehicle from being driven any significant distance.

SUMMARY OF THE INVENTION

The present invention is directed to an anti-theft method and apparatus that utilizes an assist motor of a vehicle power assist steering system.

In accordance with one aspect of the present invention, the anti-theft apparatus includes a torque sensor for sensing applied steering torque and providing a signal indicative thereof. A power assist motor is steerably connected to steerable wheels of the vehicle. The anti-theft apparatus further includes a detector for detecting whether the vehicle has an authorized user and providing a signal indicative thereof. A controller controls the power assist motor in a first mode responsive to the sensed applied steering torque when the detector detects that the vehicle has an authorized user and in a second mode responsive to the sensed applied steering torque when the detector detects that the vehicle does not have an authorized user.

According to another aspect of the current invention, a method is provided for preventing the theft of a vehicle having a power assist steering system provided including the steps of detecting whether the vehicle has an authorized user, sensing applied steering torque, and controlling the power assist steering system when the vehicle does not have an authorized user in response to the sensed applied steering torque so as to oppose the sensed steering torque.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXEMPLARY EMBODIMENT

Figure 1:
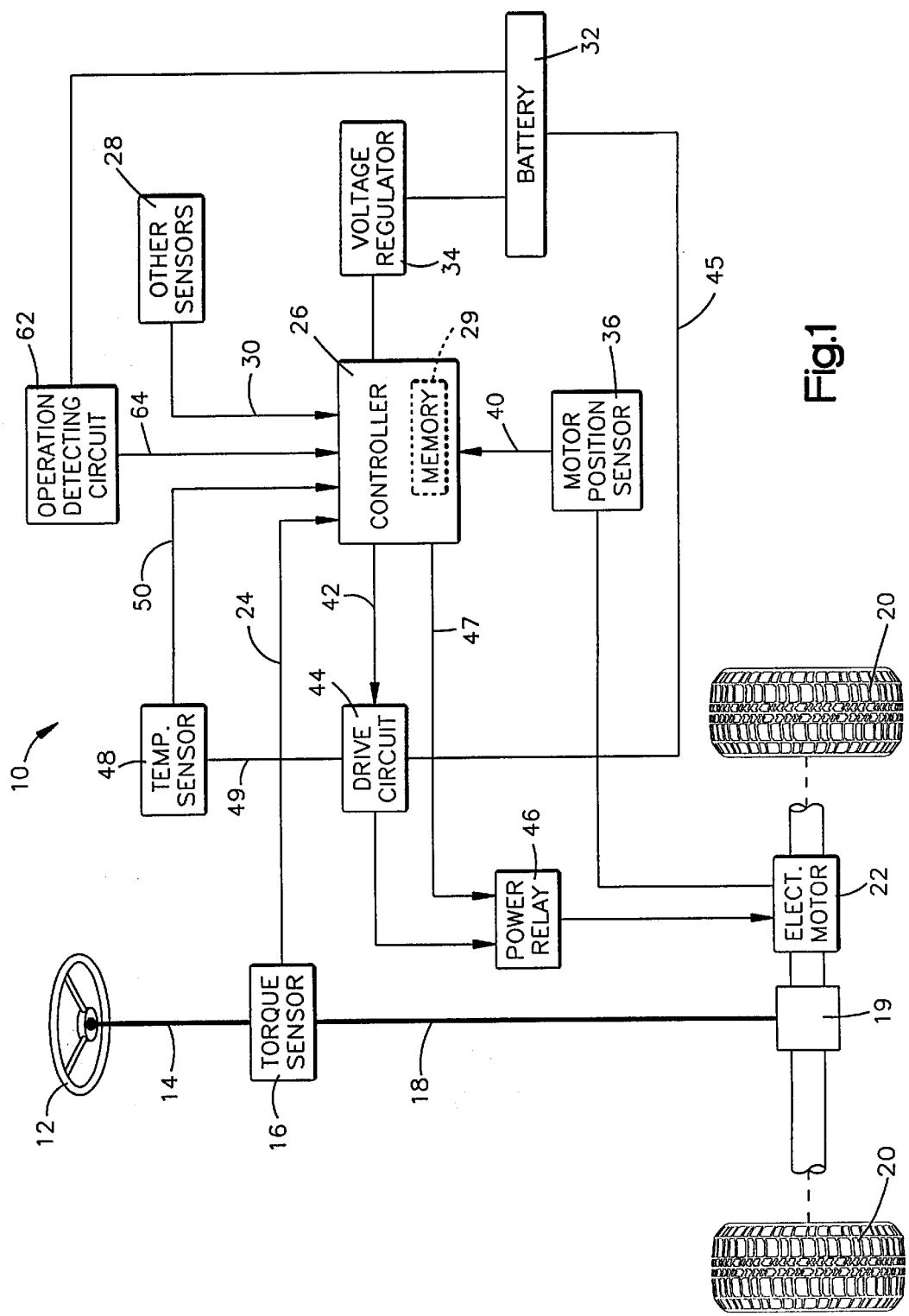
FIG. 1 is a functional block diagram of an anti-theft apparatus in accordance with an exemplary embodiment of the present invention.

Referring to FIG. 1, an apparatus 10, in accordance with an exemplary embodiment of the present invention, for use in a vehicle, includes a vehicle steering wheel 12 connected to an input shaft 14. The input shaft 14 is operatively connected to a pinion shaft 18 through a torsion bar (not shown) in a manner well known in the art. The torsion bar twists in response to steering torque applied to the vehicle steering wheel 12. The twisting of the torsion bar permits a limited amount of relative rotation between the input shaft 14 and an output shaft 18, in a known manner. A torque sensor 16 is operatively connected to the input shaft 14 and the output shaft 18 to sense the applied steering torque, i.e., the amount of relative rotation. The output shaft 18 is operatively connected to steerable wheels 20 via a rack and pinion gear set 19. Rotation of the steering wheel drives the rack which, in turn, steers the steerable wheels of the vehicle in a known manner. The present invention is also applicable to other types of steering systems other than rack and pinion.

Steering assist is provided through energization of an electric motor 22 drivably connected to a steering member such as the rack, in a known manner. By way of example, the electric motor 22 is a permanent magnet, alternating current ("PMAC") motor of known configuration having three phases A, B, and C. The PMAC motor 22 includes a stator having a plurality of stator poles disposed in a generally circular array around a rotor. The stator is mounted in a stator housing which is attached to the vehicle body. Each of the stator poles includes a plurality of conductive windings. The stator windings form phases A, B, and C. The rotor is rotatably disposed within the stator and mounted so as to rotate relative to the stator about a concentric central axis. The rotor also includes a plurality of spaced apart poles arranged in a generally circular array with permanent magnets secured to or forming at least part of each rotor pole. The rotor is drivably connected to the rack through, preferably, a ball-nut. Other drive means can be used. When the stator windings are energized by appropriate electrical signals, the energized stator poles create an electric field which acts on the magnets carried by the rotor poles to effect rotation of the rotor relative to the stator and, in turn, steering assist to aid in steering of the steerable wheels 20.

While the apparatus 10 is described in conjunction with a three phase PMAC motor, other types of electric motors, such as an induction motor, a VR motor, a synchronous motor, a permanent magnet DC motor, or a hydraulic motor having an electrically driven hydraulic pump, could be controlled in accordance with the present invention.

The electric motor 22 is drivably connected with the rack of the vehicle. Alternatively, the motor 22 could be drivably connected to the pinion or output shaft 18. That is, the apparatus 10, could be implemented with either a rack drive or a column drive type of electric assist steering system. As mentioned, the apparatus 10, in accordance with the present invention, also may be used with an electric powered hydraulic steering assist system.

In order to control operation of the motor 22, the torque sensor 16 senses the amount of steering torque applied to the steering wheel 12. The torque sensor 16 may be an inductive torque sensor, an optical torque sensor, a resistive torque sensor, or any other known type of torque sensor or position encoder configured to detect an applied steering torque. The torque sensor 16 provides a torque signal 24 to a controller 26 indicative of the amount of applied steering torque.

The controller 26, for example, may be a microprocessor or microcomputer programmed to control the electric assist motor 22 in response to one or more input signals, including the torque sensor signal 24. Other sensors 28 may provide signals 30 to the controller 26 indicative of other sensed parameters. Such other sensors 28 may include, for example, a vehicle speed sensor and/or other desirable vehicle condition sensors useful in controlling operation of the electric assist motor 22. The controller 26 may also include memory 29 having a look-up table. The look-up table of memory 29 contains motor control data, such as current or voltage command values, for energizing each phase of the electric motor 22. The values of the control data vary as a function of the input parameters provided by signals 24 and 30. The control data also varies as a function of other sensed parameters, in accordance with the present invention, as described below.

The controller 26 receives electrical power from a power supply. For example, the vehicle battery 32 is connected to the controller 26 through a voltage regulator 34. The voltage regulator 34 appropriately filters the voltage from the battery 32 and provides an output signal at a desired voltage level.

A motor position sensor 36 is operatively connected with the electric assist motor 22. In particular, the motor position sensor 36 is operatively connected between the motor stator and the motor rotor. The motor position sensor 36 monitors the relative position of the rotor and the stator of the motor 22 and provides a motor position signal 40 indicative of the sensed relative position. The motor position sensor 36 provides the signal 40 to the controller 26, which may be used to control energization of the electric motor. The motor position sensor 36 can be any known motor position sensor that provides a relatively high resolution indication of motor position.

As mentioned above, the controller 26 determines a current command value in response to the applied steering torque signal 24 and other signals 30 and 40 to produce a desired torque value from the assist motor. By way of example, the controller 26 is preprogrammed to determine a level of motor current, such as from values stored in memory look-up table 29 in response to the applied steering torque signal 24 and other signals 30 and 40. The controller 26 provides a current command signal 42 indicative of the determined level of motor current that would produce a desired amount of torque assist. The current command signal 42 includes, for example, a component for controlling energization of each phase of the electric assist motor 22. The current command signal 42 is predetermined to provide an appropriate amount of steering assist torque in response to the applied torque signal 24 and the other signals 30 and 40.

An example of a motor control arrangement for an electric assist steering system is disclosed in U.S. Pat. No. 5,475,289 to McLaughlin et al., which is assigned to TRW Inc. The McLaughlin et al. patent discloses an apparatus and method for deriving a current command value by interpolating between dual torque assist curves that are stored in appropriate memory. In the exemplary embodiment of FIG. 1, in which the controller 26 uses a look-up table to derive the current command signal, interpolation is performed to determine the value of the current command signal to be output similar to that disclosed in the McLaughlin et al. '289 patent. Such interpolation may be linear or non-linear. In this way, the controller 26 interpolates between torque assist curves to derive a motor current command signal 42 for energizing each phase of the electric motor 22 in response to the signals 24, 30, and 40.

In the exemplary embodiment, the motor current command signal 42 is supplied to a drive circuit 44. The drive circuit 44, in turn, provides appropriate levels of electric current to each phase of the motor 22 responsive to the current command signal 42. The drive circuit 44 is electrically connected to a power supply, such as the battery 32 or a voltage regulator, through an electrical connection 45. The drive circuit 44 is connected to each phase A, B, C of the electric motor 22 through a power relay circuit 46.

The drive circuit 44, for example, may include a switching circuit, such as formed of an array of switching devices (e.g., FETs). The controller 26 may include pulse-width-modulating circuitry (e.g., a PWM inverter) that provides the signal 42 as a plurality of pulse-width modulated signals. Such pulse-width-modulating circuitry alternatively could be external to the controller 26, such as being part of the drive circuit 44. The pulse-width modulated signals are provided to the switching devices of the drive circuit 44. In this way, the switching devices of the drive circuit 44 are pulse-width modulated in accordance with the current command signal 42 to provide a desired level of current to each phase A, B, C of the electric motor 22 based on the sensed steering torque and the other sensed parameters.

In the exemplary embodiment of FIG. 1, the power relay 46 forms part of a series circuit between the power supply (e.g., battery 32), the drive circuit 44, and motor 22. The power relay 46 is operative to enable or disable the electric motor 22, such as in response to a relay control signal 47 from the controller 26. Under normal operating conditions, the relay contact for each associated phase is closed so as to pass the electric current to its associated phase of the motor 22. Preferably, the power relay 46 is electrically operatively connected with at least two phases of the electric motor 22, such that, if opened, electric current will not flow to the motor 22. Note, however, that the relay 46 could be connected at other circuit locations. For example, the relay 46 could be implemented as an integral part of the electric motor 22.

The controller 26 may also be programmed to perform selected diagnostic functions to ensure proper operation of the apparatus 10 and, in particular, of the electric assist motor 22 and the drive circuit 44. In order to perform such diagnostics, the apparatus 10 includes a temperature sensor 48 operatively connected to the drive circuit 44 by a connection 49 so as to sense the temperature of the drive circuit 44. The temperature sensor 48 provides a temperature sensor signal 50 to the controller 26 indicative of the sensed temperature of the drive circuit 44. The particular temperature sensing and diagnostics may include, for example, those disclosed in U.S. Pat. No. 5,257,828 to Miller et al., which is assigned to TRW Inc.

The apparatus 10 also may include stall detection function within controller 26 through which the controller 26 determines if a motor stall condition of the electric assist motor 22 is present. The stall condition, for example, may be detected by monitoring the applied torque signal 24 in combination with sensing the commutation of the motor. A determination as to whether commutation is or is not occurring can be determined by monitoring changes in phase energization. An example of a stall detection performed that can be used with the present invention is disclosed in U.S. Pat. No. 5,517,415 also to Miller et al., which is assigned to TRW Inc. The controller 26 may, for example, provide a relay control signal 47 to de-energize and open the power relay 46 in response to detecting a motor stall condition or an over-temperature condition in the drive circuit 44. The power relay 46 de-energizes the electric motor 22 in response to the relay control signal 47.

In accordance with an exemplary embodiment of the present invention, an operation detecting circuit 62 is connected to the controller 26 and is powered from the battery 32 or the voltage regulator 34.

The operation detecting circuit 62 detects operation of the vehicle. In particular, detecting circuit 62 detects whether the vehicle has been properly started and/or whether an improper intrusion has occurred. The operation detecting circuit 62 may take any number of forms or combinations of devices. For example, the operation detecting circuit may detect a broken window, detect that the car was not properly started, detect ignition of the vehicle without a key, detect that the vehicle was started without a proper ignition code first being entered into the vehicle, and/or detect an intrusion into the vehicle without having received a proper code from a remote keyless entry device. Alternatively, the proper use of an access card may be detected. Weight and/or seat belt pay-out sensors may also be used to detect whether the user is the same weight and/or size of authorized users. If not, the user may be an unauthorized user. As is readily apparent, any of several types of detectors may be used in the current invention.

As shown in FIG. 1, the operation detecting circuit 62 communicates with the controller 26 such as by serial or parallel interconnections 64 or any other known wired or non-wired communications. The operation detecting circuit 62 could comprise a sensor connected directly to the controller 26 with the controller 26 determining improper starting or intrusion using a pre-stored algorithm.

When the vehicle has not been properly started and/or an improper intrusion has occurred, the controller 26 controls the motor in a second mode responsive to the sensed applied steering torque so as to cause the motor 22 to oppose steering torque applied to the steering wheel 12. After the controller 26 "learns" that the vehicle has not been properly started or has not been properly entered, it determines a command value in response to the applied input torque signal 24. As with the manner discussed above, the controller 26 determines an appropriate level of motor current needed to oppose the applied steering torque and provides a current command signal responsive thereto. As such, the motor 22 is commanded to oppose the input from the steering wheel 12 by the unauthorized user and the wheels 20 of the vehicle will not turn.

Another feature of the present invention is that, while the operation detecting circuit 62 may be connected to the battery 32, there is no current drawn from the battery 32 by the electric assist motor until the circuit 62 detects an unauthorized user, e.g., improper start-up and/or unauthorized entry. When the vehicle is not running, the apparatus 10 is in a protect mode. The anti-theft system becomes active only when the detecting means 62 detects that the vehicle has not been properly started. Current is only drawn by the motor 22 after it is commanded to oppose the applied steering torque applied to the steering wheel 12 by the unauthorized user. As such, when the vehicle is idle and not running, the apparatus 10 is idle and does not act as an excessive amount of current drain on the battery 32. The electrical drain from the control circuitry and sensors is minimal.

Figure 2:
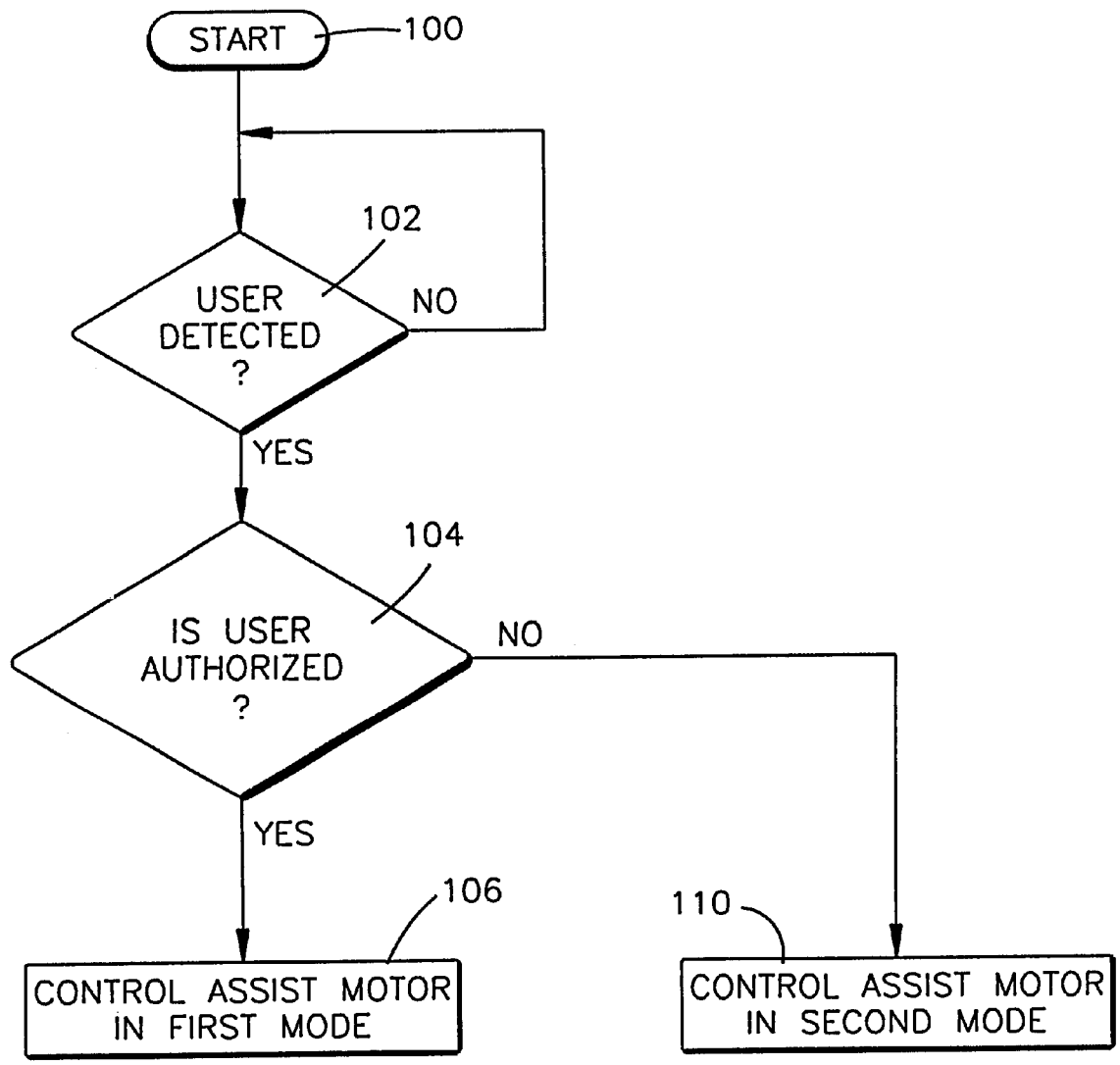
FIG. 2 is a flow diagram illustrating a control process of an exemplary embodiment of the present invention.

Referring to FIG. 2, the control operation in accordance with the present invention will be appreciated. This process would typically begin with a sensed ignition OFF condition or could begin with locking the vehicle using the vehicle's remote keyless entry ("RKE") system. The process starts at step 100 where the microcomputer is initialized, flags set to initial conditions, memories initialized, etc. The process proceeds to step 102 where a determination is made as to whether a user has been detected. If the determination is negative, the process loops back. If the determination is affirmative, the process proceeds to step 104 where a determination is made as to whether the user is an authorized user. This is accomplished by the operation detecting circuit 62 which detects whether there has been a proper start and/or a proper entry into the vehicle. If the user is authorized, e.g., no improper start and/or improper entry, then the process proceeds to step 106 where the controller controls the assist motor in the first control mode. In the first control mode, the assist motor is commanded to provide steering assist in response to the applied steering torque. If the determination made in step 104 concludes that the user is not an authorized user, e.g., improper start and/or improper entry, then the process proceeds to step 110 where the controller controls the assist motor in the second mode. In the second control mode, the assist motor is commanded to oppose the applied steering torque input from the steering wheel 12.

From the above description of the invention, those skilled in the art will perceive improvements, changes and modifications. Such improvements, changes and modifications within the skill of the art are intended to be covered by the appended claims.

Having described the invention, the following is claimed:

1. An anti-theft apparatus for use on a vehicle, said anti-theft apparatus comprising:

a torque sensor for sensing applied steering torque and providing a sensed applied steering torque signal indicative thereof;

a power assist motor steerably connected to steerable wheels of the vehicle;

detector means for detecting whether the vehicle has an authorized user and providing a signal indicative thereof; and a controller for controlling said power assist motor in a first mode responsive to the sensed applied steering torque signal when said detector means detects that the vehicle has an authorized user and in a second mode responsive to the sensed applied steering torque signal when said detector means detects that the vehicle does not have an authorized user.

2. The anti-theft apparatus of claim 1 wherein said detector means includes means for determining if the vehicle has been started by an authorized user.

3. The anti-theft apparatus of claim 1 wherein said detector means includes intrusion detecting means for determining if entrance into an interior location of the vehicle is that of an authorized entry thereby indicating an authorized user.

4. The anti-theft device of claim 1 wherein said power assist motor is an electric motor.

5. The anti-theft apparatus of claim 4 further including means for energizing said electric motor in response to said controller when vehicle ignition is in an off condition.

6. An anti-theft apparatus for use on an associated vehicle, the vehicle comprising a steering wheel operatively coupled to vehicle steerable wheels through a torque sensor, said anti-theft apparatus comprising:

an electric motor operatively associated with the steering wheel, said electric motor assisting steering movement of the steerable wheels in response to applied steering torque when said electric motor is controlled in a first mode and opposing steering movement of the steerable wheels in response to applied steering torque when said electric motor is controlled in a second mode;

detecting means for detecting whether the vehicle has an authorized user; and a controller for controlling said electric motor in said first mode when said detecting means detects that the vehicle has an authorized user and controlling said electric motor in said second mode when said detecting means detects the vehicle does not have an authorized user.

7. A method of preventing the theft of a vehicle having a power assist steering system, the method comprising the steps of:

detecting whether the vehicle has an authorized user;

sensing applied steering torque; and controlling the power assist steering system when the vehicle does not have an authorized user in response to the sensed applied steering torque so as to oppose the sensed steering torque.

8. The method of claim 7 wherein the step of detecting whether the vehicle has an authorized user includes the step of detecting if the vehicle was started using an authorized vehicle ignition key.

9. The method of claim 7 wherein the step of detecting whether the vehicle has an authorized user includes the step of detecting if entry into an interior location of the vehicle is that of an authorized user.

\* \* \* \* \*